United States Patent
Salter et al.

(10) Patent No.: US 11,535,091 B2
(45) Date of Patent: Dec. 27, 2022

(54) CLOSURE PANEL WITH INCREASED WEATHER-BLOCKING CAPACITY

(71) Applicant: Ford Global Technologies, LLC, Dearborn, MI (US)

(72) Inventors: Stuart C. Salter, White Lake, MI (US); David Brian Glickman, Southfield, MI (US); Peter Phung, Windsor (CA); Paul Kenneth Dellock, Northville, MI (US); Pietro Buttolo, Dearborn Heights, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/205,442

(22) Filed: Mar. 18, 2021

(65) Prior Publication Data
US 2022/0297516 A1 Sep. 22, 2022

(51) Int. Cl.
*B60J 5/10* (2006.01)
(52) U.S. Cl.
CPC ...................................... *B60J 5/10* (2013.01)
(58) Field of Classification Search
CPC ..... B60J 5/10; B60J 5/101; B60J 5/105; B60J 5/107; B60J 5/12; B60J 5/102; B60J 5/103; B60J 5/104; B60J 5/0494
(Continued)

(56) References Cited

U.S. PATENT DOCUMENTS

| 6,044,856 A | * | 4/2000 | Cano | B60J 5/0494 296/99.1 |
| 7,077,453 B1 | * | 7/2006 | Walker | B60R 5/04 296/76 |

(Continued)

FOREIGN PATENT DOCUMENTS

| DE | 19918454 A1 | 10/2000 |
| DE | 102013018670 A1 | 5/2015 |

(Continued)

OTHER PUBLICATIONS

Cho, Sung Hun et al. "Umbrella Of The Vehicle For Controlled Wireless Communication", KR 101461330 B1, Machine Translation, IP.com, Nov. 13, 2014 (Year: 2014).*

*Primary Examiner* — Jason S Morrow
*Assistant Examiner* — Wenwei Zhuo
(74) *Attorney, Agent, or Firm* — Vichit Chea; Price Heneveld LLP (57) ABSTRACT

A vehicle includes a body that defines an aperture. A closure panel is coupled to the body and is movable between an open position and a closed position. The closure panel covers the aperture when the closure panel is in the closed position. A support member has a first end and a second end. The first end is coupled to the body. The second end is coupled to the closure panel. The support member is operable between a compressed position and an extended position. The extended position of the support member corresponds with the open position of the closure panel. A collapsible member is coupled to the body and the support member. The collapsible (Continued)

member is movable between a stowed position and a deployed position. The collapsible member includes a first section and a second section. The collapsible member also includes a fluid drainage system.

19 Claims, 7 Drawing Sheets

(58) Field of Classification Search
USPC .................... 296/154, 146.8, 146.9, 56, 106
See application file for complete search history.

(56) References Cited

U.S. PATENT DOCUMENTS

| | | | |
|---|---|---|---|
| 9,850,680 B1 * | 12/2017 | Yi | ........................... B60J 5/0494 |
| 9,862,429 B2 | 1/2018 | Castillo et al. | |
| 10,179,502 B2 * | 1/2019 | Hija | ....................... B60J 5/0468 |
| 10,479,280 B2 | 11/2019 | Fischbein et al. | |
| 2005/0247411 A1 * | 11/2005 | Shim | ...................... B60J 5/0494 |
| | | | 160/84.07 |
| 2010/0026027 A1 | 2/2010 | Gao | |
| 2018/0370443 A1 * | 12/2018 | Fischbein | ................ B60J 5/104 |
| 2019/0001793 A1 | 1/2019 | Zeidan | |
| 2019/0040672 A1 * | 2/2019 | Wise | ....................... E05F 15/75 |

FOREIGN PATENT DOCUMENTS

| | | | | |
|---|---|---|---|---|
| GB | 2319759 A * | 6/1998 | ........... | B60J 5/0494 |
| GB | 2319759 A | 6/1998 | | |
| JP | S5885714 A | 5/1983 | | |
| KR | 101461330 B1 * | 11/2014 | ............. | B60R 25/10 |

* cited by examiner

CLOSURE PANEL WITH INCREASED WEATHER-BLOCKING CAPACITY

FIELD OF THE DISCLOSURE

The present disclosure generally relates to vehicles. More specifically, the present disclosure relates to closure panels for vehicles.

BACKGROUND OF THE INVENTION

Consumers often compare available features and functionality between vehicles when making a purchasing decision. Accordingly, additional solutions are needed that provide features and functionality that are desirable to consumers.

SUMMARY OF THE INVENTION

According to a first aspect of the present invention, a vehicle includes a body that defines an aperture. A closure panel is coupled to the body and is movable between an open position and a closed position. The closure panel covers the aperture when the closure panel is in the closed position. A support member has a first end and a second end. The first end is coupled to the body. The second end is coupled to the closure panel. The support member is operable between a compressed position and an extended position. The extended position of the support member corresponds with the open position of the closure panel. A collapsible member is coupled to the body and the support member. The collapsible member is movable between a stowed position and a deployed position. The collapsible member includes a first section and a second section. The collapsible member also includes a fluid drainage system.

Embodiments of the first aspect of the invention can include any one or a combination of the following features:
the first section and the second section each includes a first side wall, a second side wall, and a rear wall, wherein the rear wall extends between the first side wall and the second side wall;
the first section defines a first drainage aperture in the rear wall thereof, wherein the second section defines a second drainage aperture in the rear wall thereof;
the first drainage aperture and the second drainage aperture constitute at least a portion of the fluid drainage system;
a housing coupled to the body of the vehicle, wherein the housing receives the collapsible member, and wherein the first section is coupled to the housing;
the housing includes a bottom surface that extends rearwardly from a front edge of the housing, wherein the bottom surface slopes downwardly from the front edge of the housing;
the first side wall, the second side wall, and the rear wall of the first and second sections define a cavity;
the collapsible member includes an inner edge that is adjacent to the support member and an outer edge that is positioned radially outward from the inner edge;
the inner edge of the collapsible member defines a first arc length, wherein the inner edge contacts the support member along less than an entirety of the first arc length when the collapsible member is in the deployed position;
the outer edge defines a second arc length, wherein fluid that enters the collapsible member traverses at least a portion of the second arc length and exits the collapsible member by way of one or more drainage apertures defined by the collapsible member;
the collapsible member is operable between an engaged state and a disengaged state with the closure panel;
the engaged state of the collapsible member with the closure panel represents a reversible fastening of the collapsible member to the closure panel;
the second section nests within the first section when the collapsible member is in the stowed position;
the first and second sections are made from a fluid-repellent material; and
the first and second sections are coated in a fluid-repellent coating.

According to a second aspect of the present disclosure, a vehicle includes a body that defines an aperture. A closure panel is coupled to the body. The closure panel is movable between an open position and a closed position. The closure panel covers the aperture when the closure panel is in the closed position. A support member has a first end and a second end. The first end is coupled to the body. The second end is coupled to the closure panel. The support member is operable between a compressed position and an extended position. The extended position of the support member corresponds with the open position of the closure panel. A collapsible member is coupled to the body and the support member. The collapsible member is movable between a stowed position and a deployed position. The collapsible member includes a first section and a second section. The first section and the second section each include a first side wall, a second side wall, and a rear wall. The rear wall extends between the first side wall and the second side wall. The collapsible member includes a fluid drainage system. The first section defines a first drainage aperture in the rear wall thereof. The second section defines a second drainage aperture in the rear wall thereof. The first drainage aperture and the second drainage aperture constitute at least a portion of the fluid drainage system. A housing is coupled to the body of the vehicle. The housing receives the collapsible member. The first section is coupled to the housing. The housing includes a bottom surface that extends rearwardly from a front edge of the housing. The bottom surface slopes downwardly from the front edge of the housing.

Embodiments of the second aspect of the present disclosure can include any one or a combination of the following features:
the first side wall, the second side wall, and the rear wall of the first and second sections define a cavity;
the collapsible member includes an inner edge that is adjacent to the support member, wherein the inner edge of the collapsible member defines a first arc length, and wherein the inner edge contacts the support member along less than an entirety of the first arc length when the collapsible member is in the deployed position; and
an outer edge that is positioned radially outward from the inner edge, wherein the outer edge defines a second arc length, and wherein fluid that enters the collapsible member traverses at least a portion of the second arc length and exits the collapsible member by way of at least one drainage aperture chosen from the first drainage aperture and the second drainage aperture;
the collapsible member is operable between an engaged state and a disengaged state with the closure panel, and wherein the engaged state of the collapsible member with the closure panel represents a reversible fastening of the collapsible member to the closure panel; and
the second section nests within the first section when the collapsible member is in the stowed position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
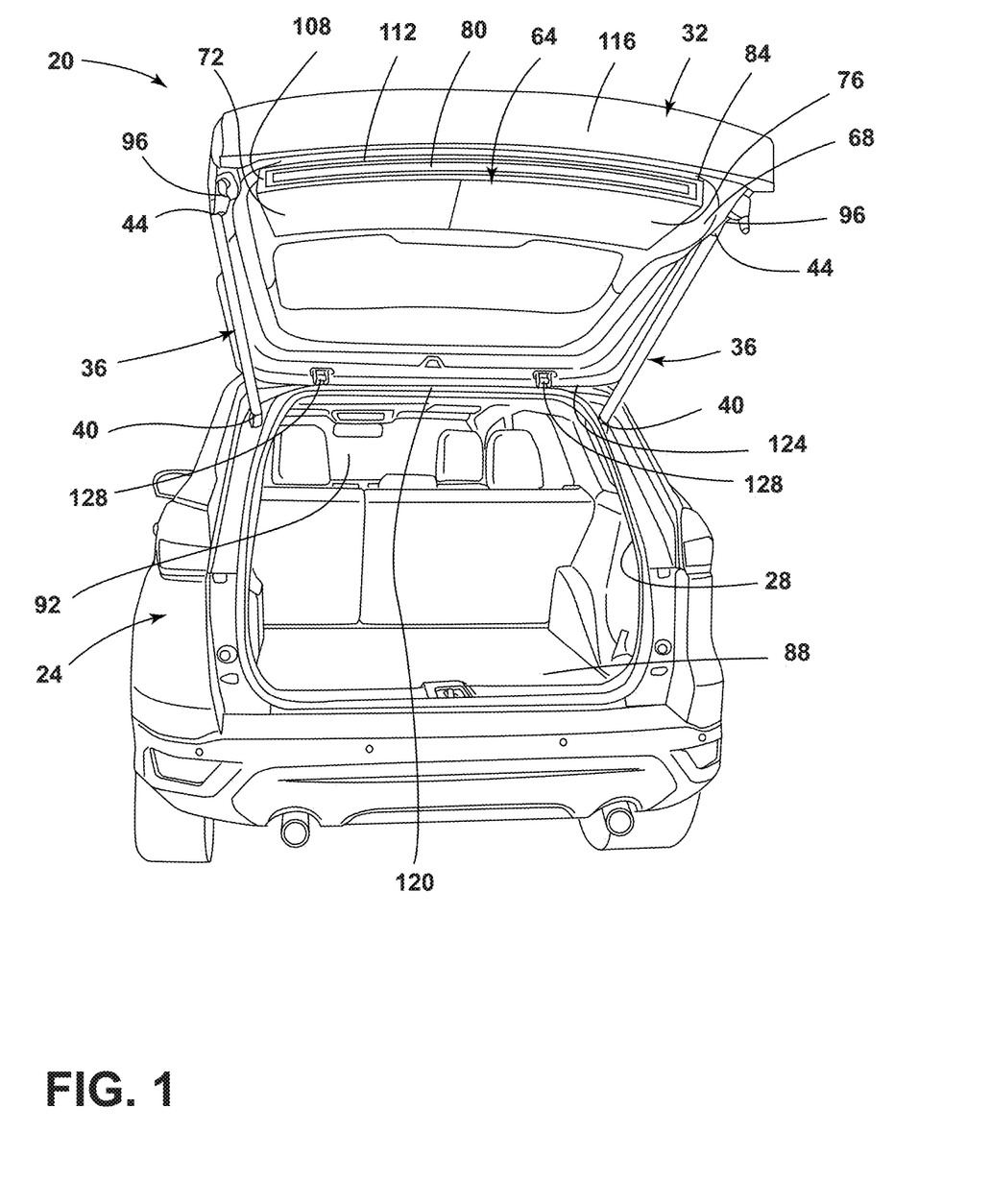
FIG. 1 is a rear perspective view of a vehicle, illustrating a closure panel in an open position.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a closure panel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-8, reference numeral 20 generally designates a vehicle. The vehicle 20 includes a body 24 that defines an aperture 28. A closure panel 32 is coupled to the body 24 and is movable between an open position and a closed position. The closure panel 32 covers the aperture 28 when the closure panel 32 is in the closed position. A support member 36 has a first end 40 and a second end 44. The first end 40 is coupled to the body 24. The second end 44 is coupled to the closure panel 32. The support member 36 is operable between a compressed position and an extended position. The extended position of the support member 36 corresponds with the open position of the closure panel 32. In various examples, the vehicle 20 includes a collapsible member 48 that is coupled to the body 24 and the support member 36. The collapsible member 48 is movable between a stowed position and a deployed position. The collapsible member 48 includes a first section 52 and a second section 56. The collapsible member 48 also includes a fluid drainage system 60. In some examples, the vehicle 20 includes a panel assembly 64 that is coupled to an interior surface 68 of the closure panel 32. The panel assembly 64 includes a first panel 72, a second panel 76, and a third panel 80. The first panel 72 and the second panel 76 can be rotatably coupled to a mounting structure 84 of the panel assembly 64. The third panel 80 can be slidably coupled to the mounting structure 84 of the panel assembly 64. The first panel 72, the second panel 76, and the third panel 80 are each movable between a stowed position and a deployed position. In some examples, the collapsible member 48 and the panel assembly 64 are both employed on the vehicle 20.

Referring again to FIGS. 1-8, the vehicle 20 may be a motor vehicle. For example, the vehicle 20 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many or all-commuting functions (e.g., accelerating, braking, turning, signaling, etc.) independent of user interaction while the user maintains override control of the vehicle 20.

Referring further to FIGS. 1-4, the aperture 28 in the body 24 can provide access to a cargo area 88 and/or a passenger compartment 92 of the vehicle 20. In various examples, the support member 36 can move between the compressed position and the extended position in a telescopic manner. For example, the support member 36 can be a gas strut or gas piston that is biased to the extended position and is capable of retaining the closure panel 32 in the open position. The support member 36 can be coupled to the closure panel 32 by an engagement between the second end 44 of the support member 36 and an anchor point 96 provided on the closure panel 32. The first panel 72 can include a first peripheral edge 100 and the second panel 76 can include a second peripheral edge 104. The rotatable coupling between the mounting structure 84 and the first and second panels 72, 76 can be accomplished at the first and second peripheral edges 100, 104, respectively. For example, the rotatable coupling between the mounting structure 84 and the first and second panels 72, 76 may be accomplished by one or more panel hinges positioned along the first and second peripheral edges 100, 104. In one specific example, the one or more panel hinges coupled to the first and second peripheral edges 100, 104 to enable the rotatable coupling with the mounting structure 84 may be living hinges.

Referring again to FIGS. 1-4, the mounting structure 84 can define a chamber 108 that receives the third panel 80. Additionally, the mounting structure 84 can define a panel aperture 112 through which the third panel 80 is actuated as the third panel 80 transitions between the stowed position and the deployed position. The panel assembly 64 can be positioned upon the closure panel 32 such that the third panel 80 extends beyond a free end 116 of the closure panel 32 when the closure panel 32 is in the open position and the third panel 80 is in the deployed position. The free end 116 of the closure panel 32 is opposite a coupled end 120 of the closure panel 32. In the depicted example, the closure panel 32 is coupled to the body 24 proximate to an upper edge 124 of the closure panel 32. For example, the closure panel 32 can be coupled to the body 24 by one or more closure hinges 128. Accordingly, the closure panel 32 can rotate in an upward direction when the closure panel 32 is transitioned from the closed position to the open position. In various examples, the coupled end 120 may be the upper edge 124 of the closure panel 32. In examples where the closure panel 32 rotates in the upward direction as the closure panel 32 is transitioned from the closed position to the open position, the first and second panels 72, 76 of the panel assembly 64 can extend downwardly from the mounting structure 84 when the first and second panels 72, 76 are in the deployed position and the closure panel 32 is in the open position.

Referring further to FIGS. 1-4, the first panel 72 and/or the second panel 76 may be provided with an actuation handle 132 that a user may utilize to deploy the first panel 72 and/or the second panel 76. In examples where the first and second panels 72, 76 extend downwardly from the mounting structure 84 when the first and second panels 72, 76 are in the deployed position and the closure panel 32 is in the open position, the first and second panels 72, 76 may extend along a plane that is non-parallel to a plane, or planes, along which the closure panel 32 extends. For example, the first and second panels 72, 76 may extend along planes that are substantially perpendicular to the closure panel 32 when the first and second panels 72, 76 are in the deployed position. The third panel 80 may be substantially parallel to at least a portion of the closure panel 32 when the third panel 80 is in the stowed position and the deployed position.

Referring still further to FIGS. 1-4, while the third panel 80 is described as being slidably coupled to the mounting structure 84, the present disclosure is not so limited. Rather, it is contemplated that the third panel 80 may be rotatably coupled to the mounting structure 84 and/or the closure panel 32 such that the third panel 80 rotates in an outward direction from the closure panel 32 when the third panel 80 is transitioned from the stowed position to the deployed position. However, it may be beneficial to have the third panel 80 slidably engage with the mounting structure 84 so as to provide support to the third panel 80 when the third panel 80 is in the deployed position without adding additional support structures to the panel assembly 64 that support the third panel 80. In examples where the third panel 80 is rotatably coupled to the mounting structure 84 and/or the closure panel 32, it may be desirable to include additional support structures that retain the third panel 80 in the stowed position and/or retain the third panel 80 in the deployed position. In examples where the third panel 80 is slidably engaged with the mounting structure 84, when the third panel 80 is in the deployed position, less than an entirety of a length of the third panel 80 may extend from the mounting structure 84. In such an example, a downward gravitational force experienced by the third panel 80 at a rearward edge 136 of the third panel may cause a forward edge 140 of the third panel 80 to contact an interior surface of the chamber 108 of the mounting structure 84 such that the deployed third panel 80 bears against the mounting structure 84 to retain and prevent unintentional decoupling of the third panel 80 from the panel assembly 64. Additionally, or alternatively, the third panel 80 may be provided with one or more interference structures that prevent the third panel 80 from exiting the panel aperture 112 by providing a thickness to the third panel 80 that is greater than the panel aperture 112.

Referring again to FIGS. 1-4, the first panel 72, the second panel 76, and the third panel 80 are generally configured to increase a weather-blocking capacity of the closure panel 32 when the first panel 72, the second panel 76, and/or the third panel 80 is in the deployed position. The term weather-blocking capacity as used herein is intended to refer to decreasing an amount of sun and/or precipitation exposure of the cargo area 88, the passenger compartment 92, and/or a user standing at the rear of the vehicle 20 and in close proximity to the closure panel 32 when the closure panel 32 is in the open position. Said another way, the first panel 72, the second panel 76, and the third panel 80 are configured to increase an effective surface area of the closure panel 32 when the first panel 72, the second panel 76, and/or the third panel 80 are in the deployed position. In some examples, the third panel 80 may be provided with a light source 144. The light source 144 may be activated automatically when the third panel 80 is transitioned from the stowed position. For example, the light source 144 may be activated when the third panel 80 is in the deployed position. In some examples, the first panel 72 and/or the second panel 76 may define a storage compartment 148 therein. The storage compartment 148 may be concealed from view when the panel to which it is coupled is in the stowed position (e.g., the first panel 72 and/or the second panel 76).

Referring now to FIGS. 5-8, in some examples, the vehicle 20 may be provided with the closure panel 32 and a tailgate 152 that together cover an entirety of the aperture 28 when the closure panel 32 and the tailgate 152 are each in the closed position. The collapsible member 48 can include a plurality of sections that are similar to the first section 52 and the second section 56 in construction, performance, and interaction. When the collapsible member 48 is in the stowed position, the plurality of sections may be telescopically retracted relative to one another and stacked upon each other such that adjacent individual sections are nested within each other. For example, the individual sections of the collapsible member 48 may interact in the same manner as that depicted in FIG. 6. The first section 52 and the second section 56 each include a first side wall 156, a second side wall 160, and a rear wall 164. The rear wall 164 extends between the first side wall 156 and the second side wall 160. The rear wall 164 of the first section 52 defines a first drainage aperture 168. The rear wall 164 of the second section 56 defines a second drainage aperture 172. The first drainage aperture 168 and the second drainage aperture 172 can constitute at least a portion of the fluid drainage system 60. A housing 176 can be coupled to the body 24 of the vehicle 20. The housing 176 receives the collapsible member 48. The first section 52 can couple to the housing 176 in a manner that prevents the first section 52 from fully exiting and/or fully decoupling from the housing 176 when the closure panel 32 is in the open position. The housing 176 can include a bottom surface 180 that extends rearwardly from a front edge 184 of the housing 176. In various examples, the bottom surface 180 slopes downwardly and away from the front edge 184 of the housing 176. In some examples, an angle 188 between the bottom surface 180 and the front edge 184 may be an obtuse angle such that any fluid that enters into the housing 176 may be encouraged to exit in the housing 176 by flowing away from the front edge 184 and toward a rearward edge of the bottom surface 180. The bottom surface 180 of the housing 176 can make up at least a portion of the fluid drainage system. In some examples, each of the individual sections of the collapsible member 48 may not be provided with a drainage aperture in the way that the first and second sections 52, 56 are provided with drainage apertures.

Figure 5:
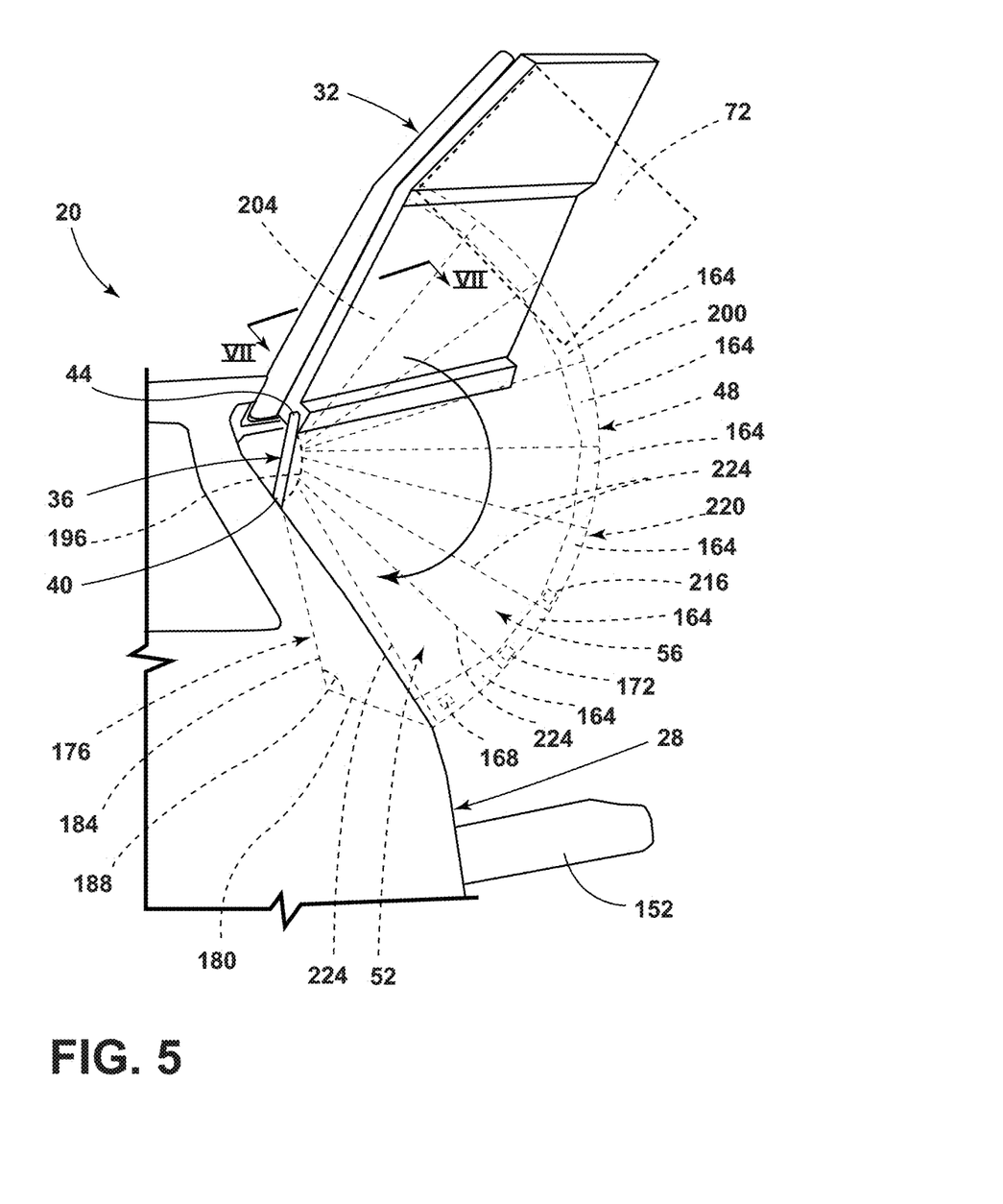
FIG. 5 is a side view of the vehicle with the closure panel in the open position, illustrating the collapsible member in an extended position and the first panel in the deployed position, both of which are in dashed lines, according to one example.
Figure 6:
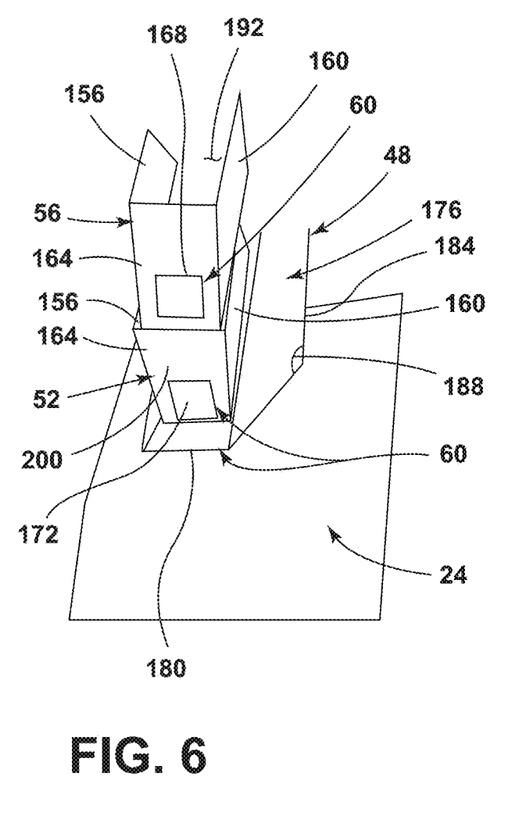
FIG. 6 is a rear perspective view of the collapsible member in the extended position, illustrating aspects of a fluid drainage system.
Figure 7:
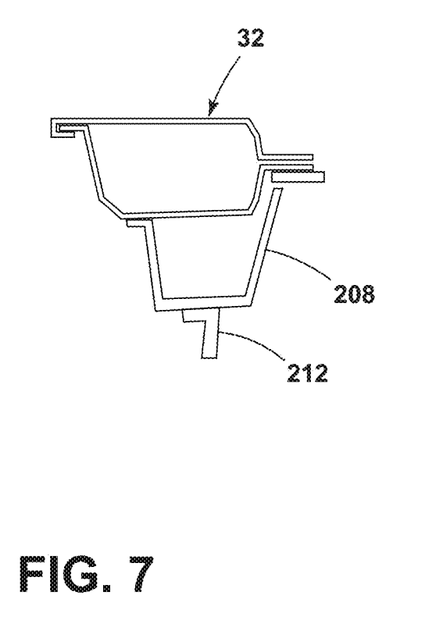
FIG. 7 is a cross-sectional view of the closure panel, taken along line VII-VII of FIG. 5, illustrating components of the closure panel.
Figure 8:
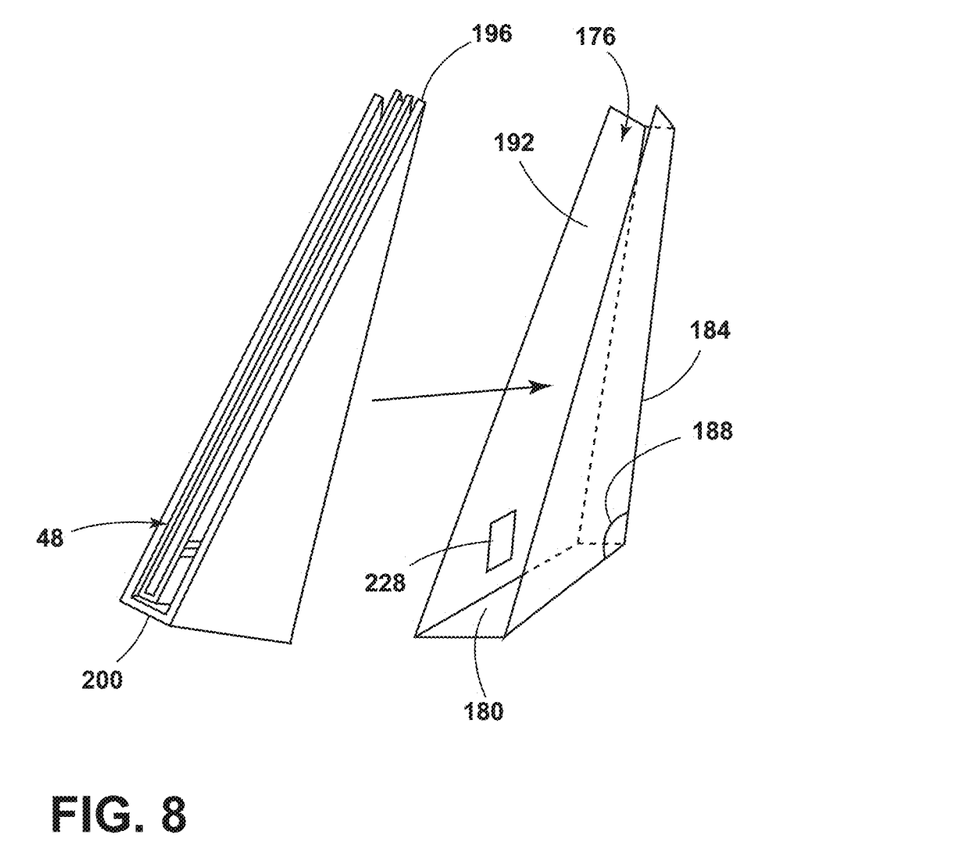
FIG. 8 is a rear perspective view of the collapsible member, illustrating an installation within a housing, according to one example.

Referring again to FIGS. 5-8, the first side wall 156, the second side wall 160, and the rear wall 164 of the first and second sections 52, 56 can define a cavity 192. The interior surfaces of the housing 176 may further define the cavity 192. The collapsible member 48 can include an inner edge 196 that is adjacent to the support member 36 and an outer edge 200 that is positioned radially outward from the inner edge 196. The inner edge 196 of the collapsible member 48 can define a first arc length. In various examples, the inner edge 196 may contact the support member 36 along less than an entirety of the first arc length when the collapsible member 48 is in the deployed position. For example, as depicted in FIG. 5, terminal sections of the plurality of sections of the collapsible member 48 may be coupled directly to the support member 36 while intermediate sections of the plurality of sections may be indirectly coupled to the support member 36 by way of the terminal sections. In one specific example, the first section 52 and a final section 204 may be coupled to the support member 36. In such an example, the first section 52 may additionally be coupled directly to the housing 176 and the final section 204 may be additionally coupled to the closure panel 32. The final section 204 may be coupled to the closure panel 32 and/or the support member 36 in a reversible or non-permanent fashion. For example, a trim panel 208 of the closure panel 32 may be provided with a fastening structure 212 to which the final section 204 may be secured. A similar structure may be provided on the support member 36 to which the final section 204 may be additionally or alternatively secured. In some examples, the mounting structure 84 may be part of the trim panel 208. Said another way, the mounting structure 84 can be integrally or unitarily formed with the trim panel 208.

Referring further to FIGS. 5-8, when the final section 204 of the collapsible member 48 is engaged with the fastening structure 212 provided on the closure panel 32 and/or the support member 36, such an arrangement may be referred to as an engaged state of the collapsible member 48 relative to the closure panel 32 and/or the support member 36. When the final section 204 is not coupled with the fastening structure 212 provided on the closure panel 32 and/or the support member 36, such an arrangement may be referred to as a disengaged state for the collapsible member 48 relative to the closure panel 32 and/or the support member 36. In examples where the inner edge 196 contacts the support member 36 along less than an entirety of the first arc length when the collapsible member 48 is in the deployed position, a gap or space may be defined by a distance between the support member 36 and portions of the intermediate sections that make up the inner edge 196, as can be seen in FIG. 5. The gap or spacing provided between the support member 36 and the portions of the intermediate sections that make up the inner edge 196 may be beneficial in allowing travel of the support member 36 as the support member 36 transitions between the compressed position and an extended position.

Referring still further to FIGS. 5-8, the outer edge 200 of the collapsible member 48 defines a second arc length. In the event that fluid (e.g., water) enters the collapsible member 48, the fluid may traverse at least a portion of the second arc length and exit the collapsible member 48 by way of one or more drainage apertures, such as the first drainage aperture 168, the second drainage aperture 172, and/or a third drainage aperture 216. The third drainage aperture 216 may be defined by the rear wall 164 of a third section 220, which is adjacent to the second section 56. It is contemplated that a plurality of the individual sections that make up the collapsible member 48 may be provided with one of the drainage apertures. For example, individual sections of the collapsible member 48 that are positioned such that a rearward edge 224 of the given section is below a horizontal line may be provided with one of the drainage apertures to prevent fluid that enters into the collapsible member 48 from intruding further into the collapsible member 48, the housing 176, and/or other structures of the vehicle 20. Said another way, drawing a horizontal line that extends outwardly from the aperture 28 of the vehicle 20, individual sections of the collapsible member 48 that have their rearward edge 224 extending in a downward direction from that horizontal line may be provided with one of the drainage apertures.

Referring again to FIGS. 5-8, by way of illustrative example, if the closure panel 32 is in the open position and the collapsible member 48 is in the deployed position while weather conditions exterior to the vehicle 20 include precipitation (e.g., rain and/or snow), then when the fluid enters into the collapsible member 48 the fluid may run down the second arc length defined by the outer edge 200 and exit through one of the drainage apertures defined by the rear walls 164 of corresponding sections of the collapsible member 48. In the event that fluid makes it past each of the provided drainage apertures, the downwardly sloping bottom surface 180 of the housing 176 can encourage the fluid to exit the collapsible member 48 and prevent the fluid from intruding into one of the various structures of the vehicle 20 and/or pooling or otherwise aggregating. As discussed above, the second section 56 can nest within the first section 52 when the collapsible member 48 is in the stowed position. When the collapsible member 48 is in the deployed position, the second section 56 may at least partially nest within the first section 52. Accordingly, fluid that enters the collapsible member 48 may alternatively flow downwardly along the first side wall 156 and/or the second side wall 160. In such a situation, the fluid that has entered the collapsible member 48 may still exit the collapsible member 48 by way of one of the drainage apertures and/or the bottom surface 180 of the housing 176.

Referring yet again to FIGS. 5-8, in some examples, the first and second sections 52, 56, as well as remaining sections of the collapsible member 48, may be made from a fluid-repellent material (e.g., fluid-repellent textiles, hydrophobic materials, and the like). Additionally, or alternatively, the first and second sections 52, 56 may be coated in a fluid-repellent coating (e.g., a hydrophobic coating). In some examples, the closure panel 32 may be provided with the collapsible member 48 and the panel assembly 64. In such an example, when one or more of the first panel 72, the second panel 76, and the third panel 80 are in the deployed position, fluid that contacts one of these panels may ultimately enter into the collapsible member 48 at which point the fluid would be shed by way of the fluid drainage system 60 described above. For example, the first panel 72 may contact the outer edge 200 of the collapsible member 48. Accordingly, fluid or precipitation that contacts an exterior surface of the first panel 72 may have a tendency to run down the rear walls 164 of the individual sections of the collapsible member 48 and ultimately into the collapsible member 48. However, the arcuate shape provided to the collapsible member 48 along the outer edge 200 may have a tendency to shed or dispel the water by way of gravity prior to the fluid reaching one of the drainage apertures.

Referring further to FIGS. 5-8, the housing 176 may be provided with an attachment point 228 to which the collapsible member 48 can be coupled. For example, the first section 52 may be coupled to the housing 176 by way of the attachment point 228 such that upon deployment of the closure panel 32 when the final section 204 is coupled to the fastening structure 212, the individual sections that make up the collapsible member 48 may be continuously deployed along an arc length that extends from the body 24 of the vehicle to the open closure panel 32. It is contemplated that the vehicle 20 may be provided with the ability to selectively engage the collapsible member 48 (e.g., by way of a user interface and/or a controller) and thereby provide a non-manual engagement of the collapsible member 48 that enables the collapsible member 48 to transition from the stowed position to the deployed position. In such an example, the collapsible member 48 may be fixed to the closure panel 32 and selectively decoupled from the attachment point 228 of the housing 176 such that the collapsible member 48 travels with the closure panel 32 as the closure panel transitions between the open position and the closed position. In various examples, the engagement between the closure panel 32, the collapsible member 48, and/or the housing 176 may be accomplished in an entirely manual fashion such that the user selects whether the collapsible member 48 is maintained within the housing 176 when in the disengaged state or whether the collapsible member 48 travels with the closure panel 32 when the collapsible member 48 is in the disengaged state.

Figure 2:
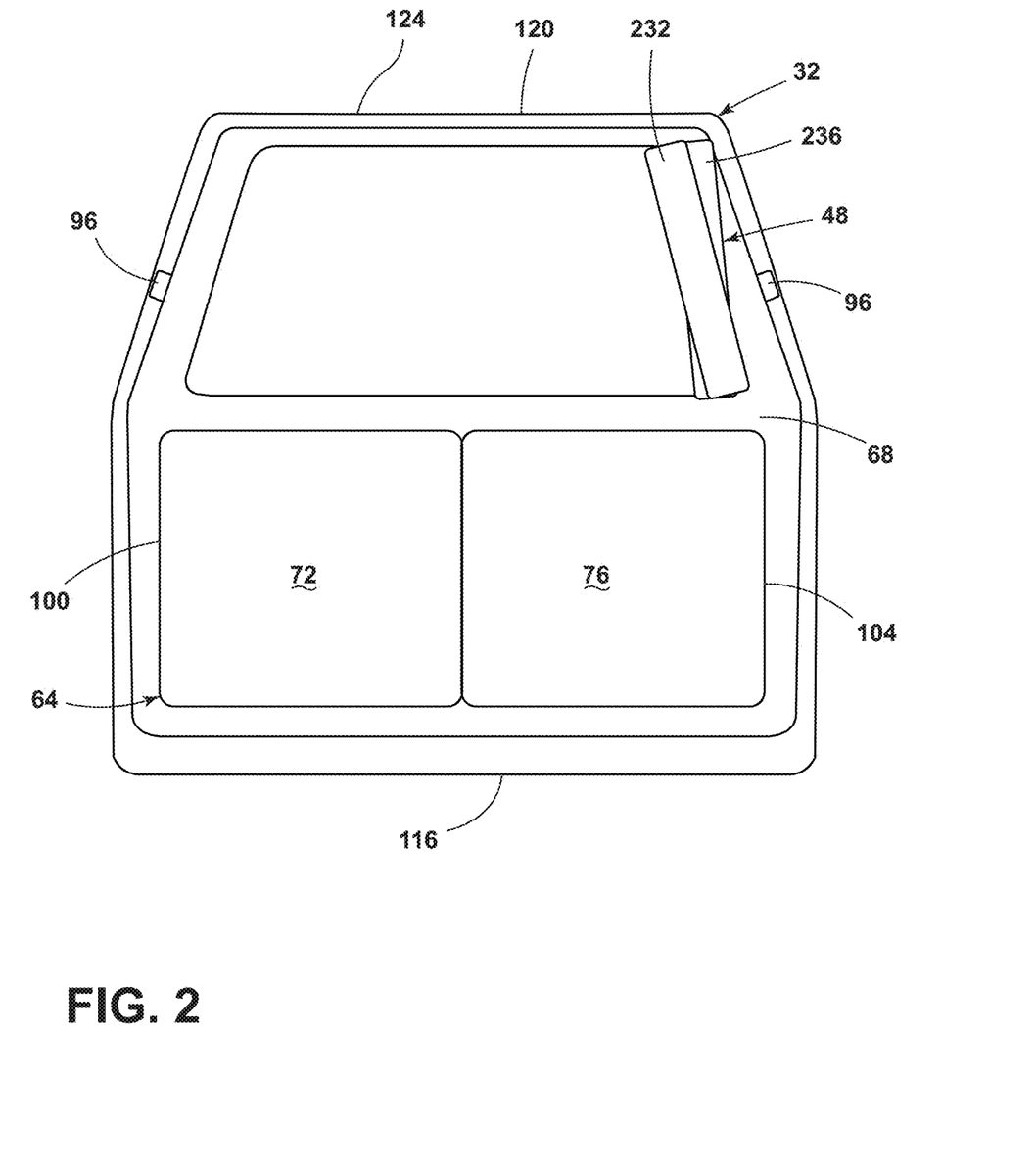
FIG. 2 is a front view of an interior surface of the closure panel, illustrating a collapsible member and a panel assembly coupled thereto, according to one example.
Figure 3:
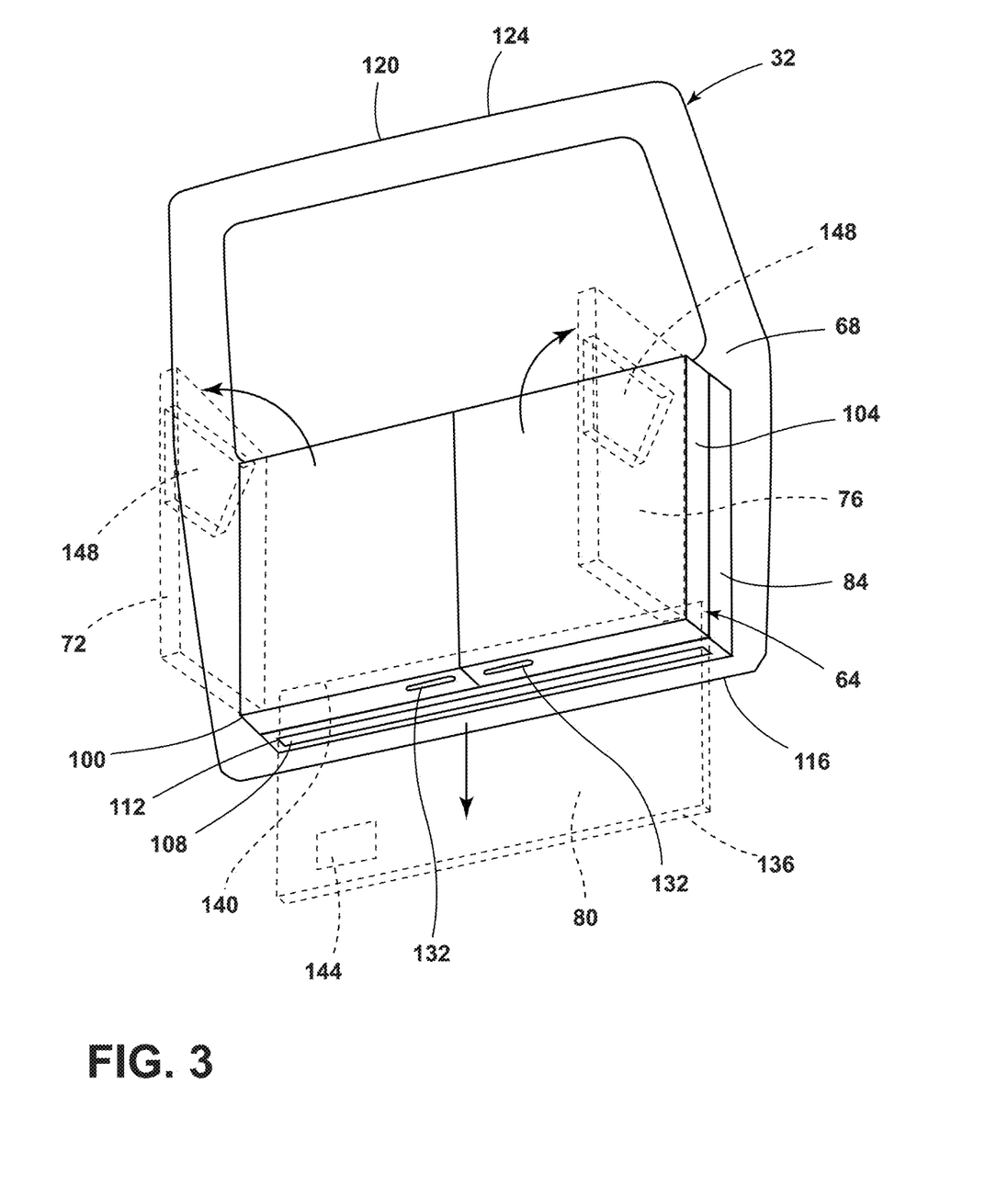
FIG. 3 is a front perspective view of the interior surface of the closure panel, illustrating a first panel, a second panel, and a third panel, according to one example.
Figure 4:
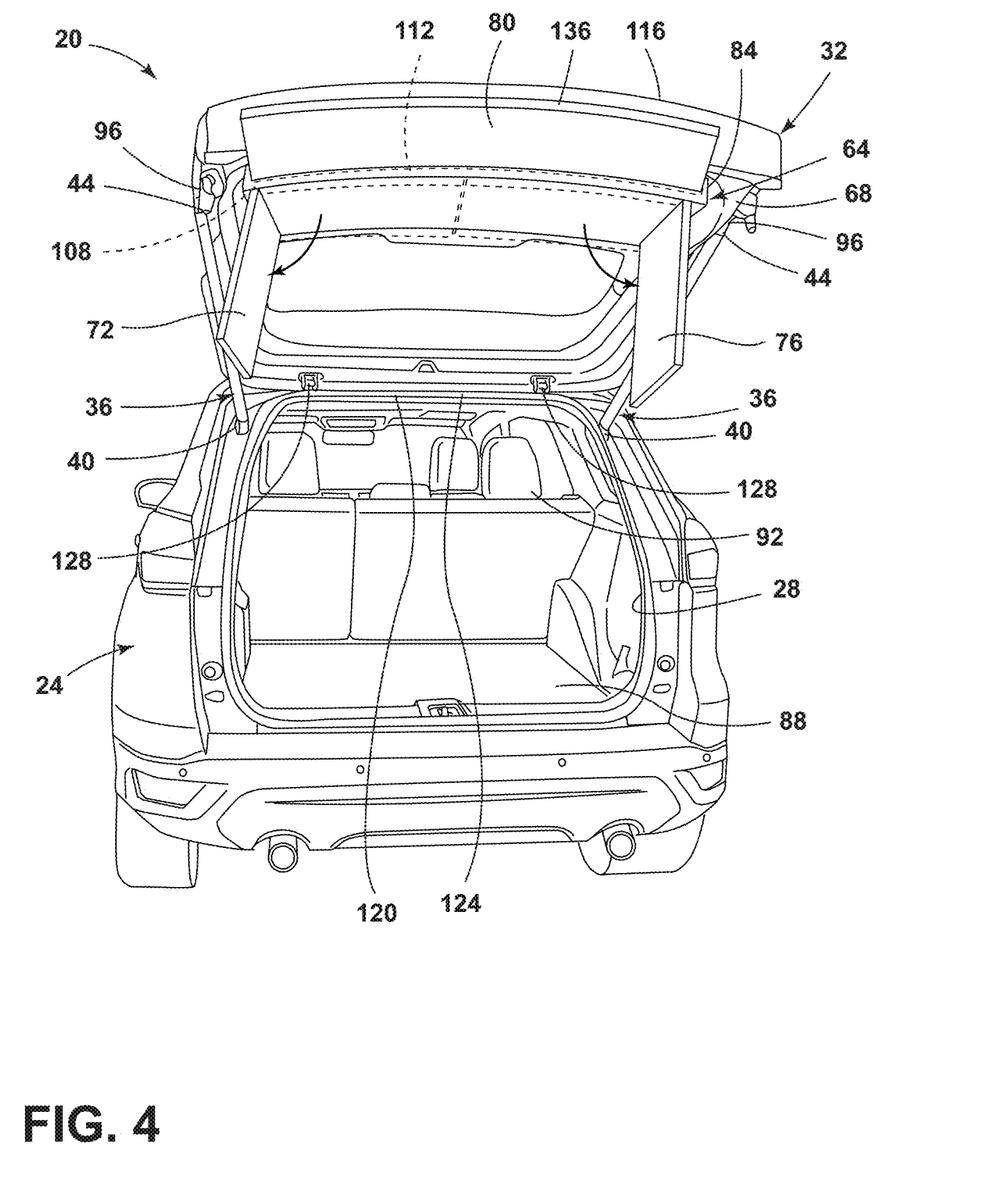
FIG. 4 is a rear perspective view of the vehicle, illustrating the closure panel in the open position and the first, second, and third panels each in a deployed position.

Referring now to FIGS. 1-8, in some examples, the coupling between the body 24 and the collapsible member 48, as well as the coupling between the closure panel 32 and the collapsible member 48 may be angularly offset from one another (see FIG. 2). For example, a first coupling profile 232 of the collapsible member 48 with the body 24 may be angled slightly inwardly when compared to a second coupling profile 236 of the collapsible member 48 with the closure panel 32. Such an arrangement may be beneficial in providing additional clearance between the support member 36 and the collapsible member 48 during deployment of the collapsible member 48 as the closure panel 32 is transitioned from the closed position to the open position and vice versa. Such an arrangement may prevent unintended contact between the support member 36 and individual sections of the collapsible member 48 as the support member 36 is transitioned between the compressed position and the extended position.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
   a body that defines an aperture;
   a closure panel coupled to the body, wherein the closure panel is movable between an open position and a closed position, and wherein the closure panel covers the aperture when the closure panel is in the closed position;
   a support member having a first end and a second end, wherein the first end is coupled to the body, wherein the second end is coupled to the closure panel, wherein the support member is operable between a compressed position and an extended position, and wherein the extended position of the support member corresponds with the open position of the closure panel; and
   a collapsible member that is coupled to the body and the support member, wherein the collapsible member is movable between a stowed position and a deployed position, wherein the collapsible member comprises a first section and a second section, wherein the first section and the second section each comprise a first side wall, a second side wall, and a rear wall, wherein the rear wall extends between the first side wall and the second side wall, and wherein the collapsible member comprises a fluid drainage system.

2. The vehicle of claim 1, wherein the first section defines a first drainage aperture in the rear wall thereof, and wherein the second section defines a second drainage aperture in the rear wall thereof.

3. The vehicle of claim 2, wherein the first drainage aperture and the second drainage aperture constitute at least a portion of the fluid drainage system.

4. The vehicle of claim 2, further comprising:
   a housing coupled to the body of the vehicle, wherein the housing receives the collapsible member, and wherein the first section is coupled to the housing.

5. The vehicle of claim 4, wherein the housing comprises a bottom surface that extends rearwardly from a front edge of the housing, and wherein the bottom surface slopes downwardly from the front edge of the housing.

6. The vehicle of claim 1, wherein the first side wall, the second side wall, and the rear wall of the first and second sections define a cavity.

7. The vehicle of claim 1, wherein the collapsible member further comprises:
   an inner edge that is adjacent to the support member; and
   an outer edge that is positioned radially outward from the inner edge.

8. The vehicle of claim 7, wherein the inner edge of the collapsible member defines a first arc length, and wherein the inner edge contacts the support member along less than an entirety of the first arc length when the collapsible member is in the deployed position.

9. The vehicle of claim 8, wherein the outer edge defines a second arc length, and wherein fluid that enters the collapsible member traverses at least a portion of the second arc length and exits the collapsible member by way of one or more drainage apertures defined by the collapsible member.

10. The vehicle of claim 1, wherein the collapsible member is operable between an engaged state and a disengaged state with the closure panel.

11. The vehicle of claim 10, wherein the engaged state of the collapsible member with the closure panel represents a reversible fastening of the collapsible member to the closure panel.

12. The vehicle of claim 1, wherein the second section nests within the first section when the collapsible member is in the stowed position.

13. The vehicle of claim 1, wherein the first and second sections are made from a fluid-repellent material.

14. The vehicle of claim 1, wherein the first and second sections are coated in a fluid-repellent coating.

15. A vehicle, comprising:
   a body that defines an aperture;
   a closure panel coupled to the body, wherein the closure panel is movable between an open position and a closed position, and wherein the closure panel covers the aperture when the closure panel is in the closed position;
   a support member having a first end and a second end, wherein the first end is coupled to the body, wherein the second end is coupled to the closure panel, wherein the support member is operable between a compressed position and an extended position, and wherein the extended position of the support member corresponds with the open position of the closure panel;

a collapsible member that is coupled to the body and the support member, wherein the collapsible member is movable between a stowed position and a deployed position, wherein the collapsible member comprises a first section and a second section, wherein the first section and the second section each comprise a first side wall, a second side wall, and a rear wall, wherein the rear wall extends between the first side wall and the second side wall, wherein the collapsible member comprises a fluid drainage system, wherein the first section defines a first drainage aperture in the rear wall thereof, wherein the second section defines a second drainage aperture in the rear wall thereof, wherein the first drainage aperture and the second drainage aperture constitute at least a portion of the fluid drainage system; and a housing coupled to the body of the vehicle, wherein the housing receives the collapsible member, and wherein the first section is coupled to the housing, wherein the housing comprises a bottom surface that extends rearwardly from a front edge of the housing, and wherein the bottom surface slopes downwardly from the front edge of the housing.

16. The vehicle of claim 15, wherein the first side wall, the second side wall, and the rear wall of the first and second sections define a cavity.

17. The vehicle of claim 15, wherein the collapsible member further comprises:

an inner edge that is adjacent to the support member, wherein the inner edge of the collapsible member defines a first arc length, and wherein the inner edge contacts the support member along less than an entirety of the first arc length when the collapsible member is in the deployed position; and an outer edge that is positioned radially outward from the inner edge, wherein the outer edge defines a second arc length, and wherein fluid that enters the collapsible member traverses at least a portion of the second arc length and exits the collapsible member by way of at least one drainage aperture chosen from the first drainage aperture and the second drainage aperture.

18. The vehicle of claim 15, wherein the collapsible member is operable between an engaged state and a disengaged state with the closure panel, and wherein the engaged state of the collapsible member with the closure panel represents a reversible fastening of the collapsible member to the closure panel.

19. The vehicle of claim 15, wherein the second section nests within the first section when the collapsible member is in the stowed position.

* * * * *